(12) United States Patent
Liu et al.

(10) Patent No.: US 8,737,504 B2
(45) Date of Patent: May 27, 2014

(54) METHOD AND SYSTEM FOR FEEDBACK OF CHANNEL INFORMATION

(75) Inventors: Lingjia Liu, Plano, TX (US); Jianzhong Zhang, Irving, TX (US); Young-Han Nam, Richardson, TX (US)

(73) Assignee: Samsung Electronics Co., Ltd., Suwon-Si ( * ) Notice: Subject to any disclaimer, the term of this patent is extended or adjusted under 35 U.S.C. 154(b) by 631 days.

(21) Appl. No.: 12/896,738

(22) Filed: Oct. 1, 2010

(65) Prior Publication Data

US 2011/0080965 A1   Apr. 7, 2011

Related U.S. Application Data

(60) Provisional application No. 61/278,262, filed on Oct. 5, 2009, provisional application No. 61/260,318, filed on Nov. 11, 2009.

(51) Int. Cl.
*H04B 7/02* (2006.01)

(52) U.S. Cl.
USPC ........... 375/267; 370/334; 375/299; 375/347; 455/101

(58) Field of Classification Search
None
See application file for complete search history.

(56) References Cited

U.S. PATENT DOCUMENTS

| | | | |
|---|---|---|---|
| 2011/0142107 A1* | 6/2011 | Pan et al. | 375/219 |
| 2011/0243066 A1* | 10/2011 | Nazar et al. | 370/328 |

* cited by examiner

*Primary Examiner* — Adolf Dsouza

(57) ABSTRACT

A base station is provided. The base station includes a transmit path circuitry configured to transmit downlink control information in a downlink control information (DCI) format to a subscriber station, and a receive path circuitry configured to receive multiple-input multiple-output (MIMO) feedback from the subscriber station in response to the downlink control information. The MIMO feedback from the subscriber station is determined by two or more codepoints in the DCI format. One of the two or more codepoints indicates a rank-limited single user multiple-input multiple-output (SU-MIMO) feedback corresponding to a rank up to a maximum rank.

28 Claims, 9 Drawing Sheets

600
| $\lambda_2/\lambda_1$ | STATE | UL FEEDBACK | BIT-WIDTH FOR CODEBOOK FOR $v_1$ | BIT-WIDTH FOR CODEBOOK FOR $v_2$ |
|---|---|---|---|---|
| [1, 0.8] | 1 | [1 1] | 4 | 4 |
| (0.8, 0.5] | 2 | [1 0] | 5 | 3 |
| (0.5, 0.2] | 3 | [0 1] | 6 | 2 |
| (0.2, 0] | 4 | [0 0] | 8 | 0 |
FIG. 6
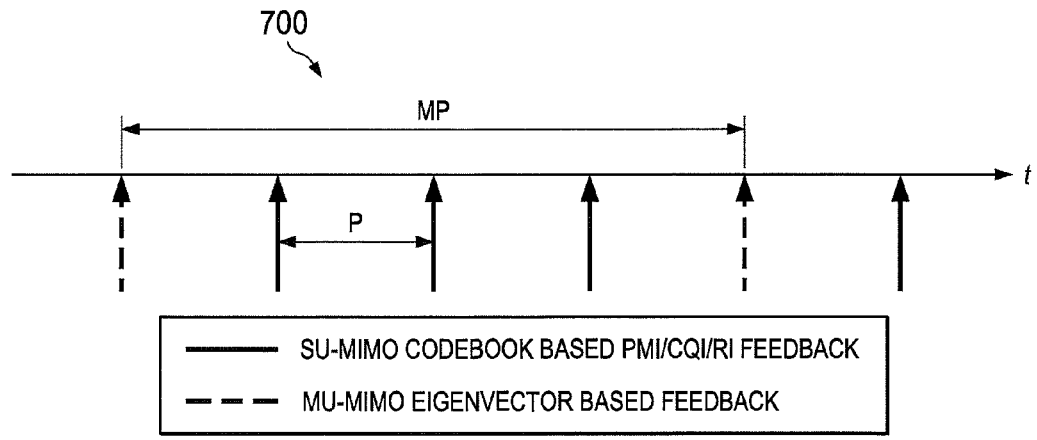
FIG. 7
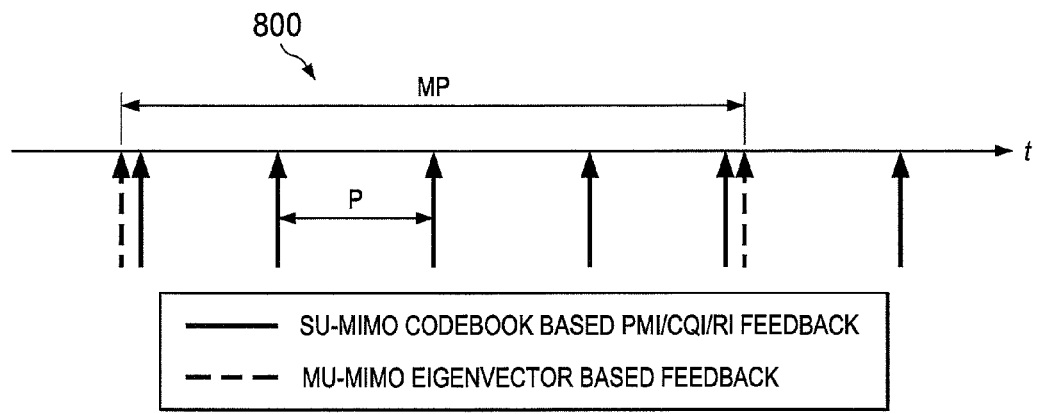
FIG. 8

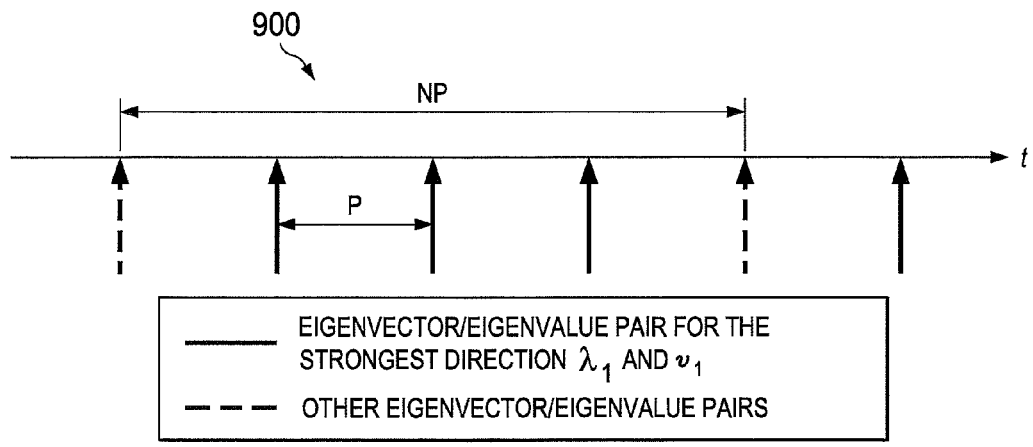
FIG. 9
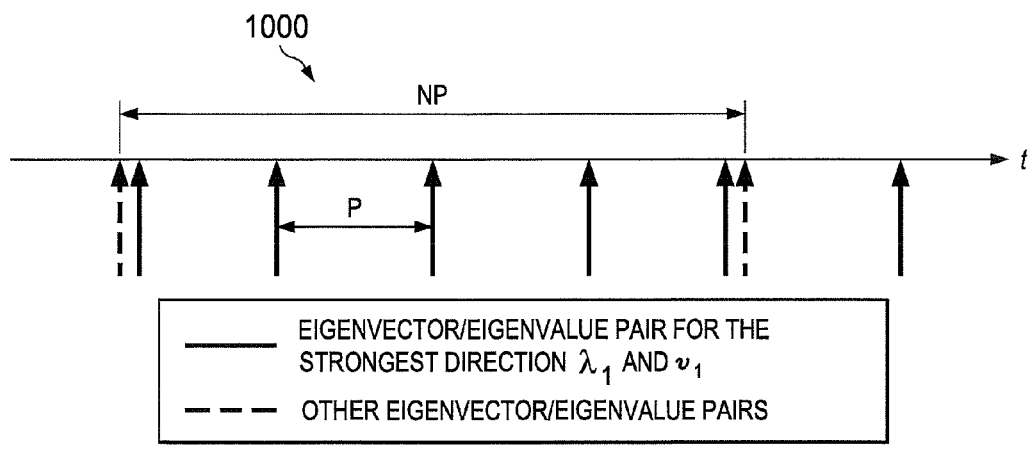
FIG. 10
| PMI FEEDBACK | INDICATION | STRONGEST EIGEN-DIRECTION | INDICATION | STRONGEST EIGEN-DIRECTION |
|---|---|---|---|---|
| $[w_1, w_2]$ | 0 | $w_1$ | 1 | $w_2$ |
FIG. 11

1200

| STATE NUMBER | FEEDBACK CONTENTS |
|---|---|
| 1 | SU-MIMO CQI/PMI/RI FEEDBACK |
| 2 | MU-MIMO FEEDBACK |

| STATE NUMBER | FEEDBACK CONTENTS |
|---|---|
| 3 | SU-MIMO CQI/PMI/RI FEEDBACK |
| 4 | SU-MIMO CQI/PMI/RI FEEDBACK WITH RI ≤ 2 |

| CQI REQUEST BIT | PADDING BIT | INDICATION |
|---|---|---|
| 0 | 1 | NON-CONTIGUOUS SRS ALLOCATION [6] |
| 1 | 0 | STATE 1 IF ONE BETWEEN THE TWO STATES IN TABLE 1 CAN BE CONFIGURED; STATE 3 IF ONE BETWEEN THE TWO STATES IN TABLE 2 CAN BE CONFIGURED |
| 1 | 1 | STATE 2 IF ONE BETWEEN THE TWO STATES IN TABLE 1 CAN BE CONFIGURED; STATE 4 IF ONE BETWEEN THE TWO STATES IN TABLE 2 CAN BE CONFIGURED |
| 0 | 0 | DOWNLINK GRANT (SCHEDULING OF PUSCH) |

| CQI REQUEST BIT | PADDING BIT | INDICATION |
|---|---|---|
| 0 | 1 | NON-CONTIGUOUS SRS ALLOCATION [6] |
| 1 | 0 | STATE 2 IF ONE BETWEEN THE TWO STATES IN TABLE 1 CAN BE CONFIGURED; STATE 4 IF ONE BETWEEN THE TWO STATES IN TABLE 2 CAN BE CONFIGURED |
| 1 | 1 | STATE 1 IF ONE BETWEEN THE TWO STATES IN TABLE 1 CAN BE CONFIGURED; STATE 3 IF ONE BETWEEN THE TWO STATES IN TABLE 2 CAN BE CONFIGURED |
| 0 | 0 | DOWNLINK GRANT (SCHEDULING OF PUSCH) |

| | | PMI FEEDBACK TYPE | | |
|---|---|---|---|---|
| | | NO PMI | SINGLE PMI | MULTIPLE PMI |
| FEEDBACK | WIDEBAND (WIDEBAND CQI) | | | MODE 1-2 |
| TYPE | UE SELECTED (SUBBAND CQI) | MODE 2-0 | | MODE 2-2 |
| PUSCH CQI | HIGH LAYER-CONFIGURED (SUBBAND CQI) | MODE 3-0 | MODE 3-1 | |

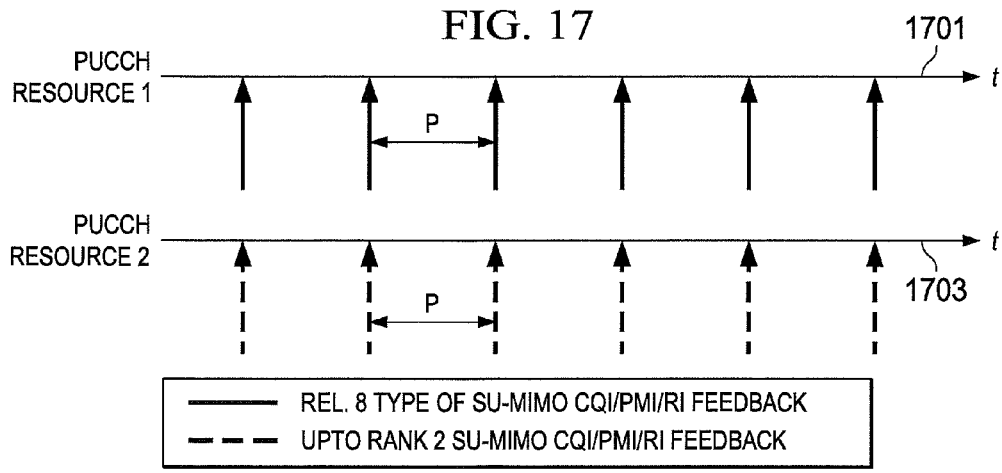

FIG. 17

METHOD AND SYSTEM FOR FEEDBACK OF CHANNEL INFORMATION

CROSS-REFERENCE TO RELATED APPLICATION(S) AND CLAIM OF PRIORITY

The present application is related to U.S. Provisional Patent Application No. 61/278,262, filed Oct. 5, 2009, entitled "CHANNEL FEEDBACK DESIGN FOR LTE-A SU/MU MIMO SYSTEMS". Provisional Patent Application No. 61/278,262 is assigned to the assignee of the present application and is hereby incorporated by reference into the present application as if fully set forth herein. The present application hereby claims priority under 35 U.S.C. §119(e) to U.S. Provisional Patent Application No. 61/278,262.

The present application also is related to U.S. Provisional Patent Application No. 61/260,318, filed Nov. 11, 2009, entitled "IMPLICIT FEEDBACK IN SUPPORT OF SU/MU-MIMO". Provisional Patent Application No. 61/260,318 is assigned to the assignee of the present application and is hereby incorporated by reference into the present application as if fully set forth herein. The present application hereby claims priority under 35 U.S.C. §119(e) to U.S. Provisional Patent Application No. 61/260,318.

TECHNICAL FIELD OF THE INVENTION

The present application relates generally to wireless communications and, more specifically, to a method and system for indicating the method used to scramble dedicated reference signals.

BACKGROUND OF THE INVENTION

In $3^{rd}$ Generation Partnership Project Long Term Evolution (3GPP LTE), Orthogonal Frequency Division Multiplexing (OFDM) is adopted as a downlink (DL) transmission scheme.

SUMMARY OF THE INVENTION

A base station is provided. The base station comprises a transmit path circuitry configured to transmit downlink control information in a downlink control information (DCI) format to a subscriber station, and a receive path circuitry configured to receive multiple-input multiple-output (MIMO) feedback from the subscriber station in response to the downlink control information. The MIMO feedback from the subscriber station is determined by two or more codepoints in the DCI format. One of the two or more codepoints indicates a rank-limited single user multiple-input multiple-output (SU-MIMO) feedback corresponding to a rank up to a maximum rank.

A method of operating a base station is provided. The method comprises transmitting downlink control information in a downlink control information (DCI) format to a subscriber station, and receiving multiple-input multiple-output (MIMO) feedback from the subscriber station in response to the downlink control information. The MIMO feedback from the subscriber station is determined by two or more codepoints in the DCI format. One of the two or more codepoints indicates a rank-limited single user multiple-input multiple-output (SU-MIMO) feedback corresponding to a rank up to a maximum rank.

A subscriber station is provided. The subscriber station comprises a receive path circuitry configured to receive downlink control information in a downlink control information (DCI) format from a base station, and a transmit path circuitry configured to transmit multiple-input multiple-output (MIMO) feedback to the base station in response to the downlink control information. The MIMO feedback from the subscriber station is determined by two or more codepoints in the DCI format. One of the two or more codepoints indicates a rank-limited single user multiple-input multiple-output (SU-MIMO) feedback corresponding to a rank up to a maximum rank.

A method of operating a subscriber station is provided. The method comprises receiving downlink control information in a downlink control information (DCI) format from a base station, and transmitting multiple-input multiple-output (MIMO) feedback to the base station in response to the downlink control information. The MIMO feedback from the subscriber station is determined by two or more codepoints in the DCI format. One of the two or more codepoints indicates a rank-limited single user multiple-input multiple-output (SU-MIMO) feedback corresponding to a rank up to a maximum rank.

A base station is provided. The base station comprises a transmit path circuitry configured to transmit a higher layer signaling to a subscriber station, and a receive path circuitry configured to receive multiple-input multiple-output (MIMO) feedback from the subscriber station in response to the higher layer signaling. The higher layer signaling indicates a periodicity, an offset, and a physical uplink control channel (PUCCH) resource for each of two or more MIMO feedback processes used for the MIMO feedback by the subscriber station. One of the two or more MIMO feedback processes is a rank-limited single user multiple-input multiple-output (SU-MIMO) feedback process corresponding to a rank up to a maximum rank.

A method of operating a base station is provided. The method comprises transmitting a higher layer signaling to a subscriber station, and receiving multiple-input multiple-output (MIMO) feedback from the subscriber station in response to the higher layer signaling. The higher layer signaling indicates a periodicity, an offset, and a physical uplink control channel (PUCCH) resource for each of two or more MIMO feedback processes used for the MIMO feedback by the subscriber station. One of the two or more MIMO feedback processes is a rank-limited single user multiple-input multiple-output (SU-MIMO) feedback process corresponding to a rank up to a maximum rank.

A subscriber station is provided. The subscriber station comprises a receive path circuitry configured to receive a higher layer signaling from a base station, and a transmit path circuitry configured to transmit multiple-input multiple-output (MIMO) feedback to the base station in response to the higher layer signaling. The higher layer signaling indicates a periodicity, an offset, and a physical uplink control channel (PUCCH) resource for each of two or more MIMO feedback processes used for the MIMO feedback by the subscriber station. One of the two or more MIMO feedback processes is a rank-limited single user multiple-input multiple-output (SU-MIMO) feedback process corresponding to a rank up to a maximum rank.

A method of operating a subscriber station is provided. The method comprises receiving a higher layer signaling from a base station, and transmitting multiple-input multiple-output (MIMO) feedback to the base station in response to the higher layer signaling. The higher layer signaling indicates a periodicity, an offset, and a physical uplink control channel (PUCCH) resource for each of two or more MIMO feedback processes used for the MIMO feedback by the subscriber station. One of the two or more MIMO feedback processes is a rank-limited single user multiple-input multiple-output (SU-MIMO) feedback process corresponding to a rank up to a maximum rank.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a table depicting a relationship between a payload size of a codebook and a ratio between a second largest eigenvalue (or singular value) and a first largest eigenvalue (or singular value) according to an embodiment of this disclosure;

FIG. 7 illustrates a timeline in which feedback for SU-MIMO transmission is multiplexed together with feedback for MU-MIMO transmission according to an embodiment of this disclosure;

FIG. 8 illustrates a timeline in which feedback for SU-MIMO transmission is multiplexed together with feedback for MU-MIMO transmission according to another embodiment of this disclosure;

FIG. 9 illustrates a timeline in which feedback for SU-MIMO transmission is multiplexed together with feedback for MU-MIMO transmission according to yet another embodiment of this disclosure;

FIG. 10 illustrates a timeline in which feedback for SU-MIMO transmission is multiplexed together with feedback for MU-MIMO transmission according to a further embodiment of this disclosure;

FIG. 11 illustrates a table depicting use of a one-bit indicator to indicate a dominant eigen-direction of a channel according to an embodiment of this disclosure;

FIG. 12 illustrates a table correlating different feedback contents with state numbers according to an embodiment of this disclosure;

FIG. 13 illustrates a table correlating different feedback contents with state numbers according to another embodiment of this disclosure;

FIG. 14 illustrates a table mapping two states to codepoints in a DCI format according to an embodiment of this disclosure;

FIG. 15 illustrates a table mapping two states to codepoints in a DCI format according to another embodiment of this disclosure;

FIG. 16 illustrates a table mapping feedback types to physical uplink shared channel (PUCCH) reporting modes according to an embodiment of this disclosure;

FIG. 17 illustrates a first timeline of a first physical uplink control channel (PUCCH) resource carrying a first CQI report and a second timeline of a second PUCCH resource carrying a second CQI report at a same periodicity according to an embodiment of this disclosure;

DETAILED DESCRIPTION OF THE INVENTION

FIGS. 1 through 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE term "node B" is another term for "base station" used below. Also, the LTE term "user equipment" or "UE" is another term for "subscriber station" used below.

Figure 1:
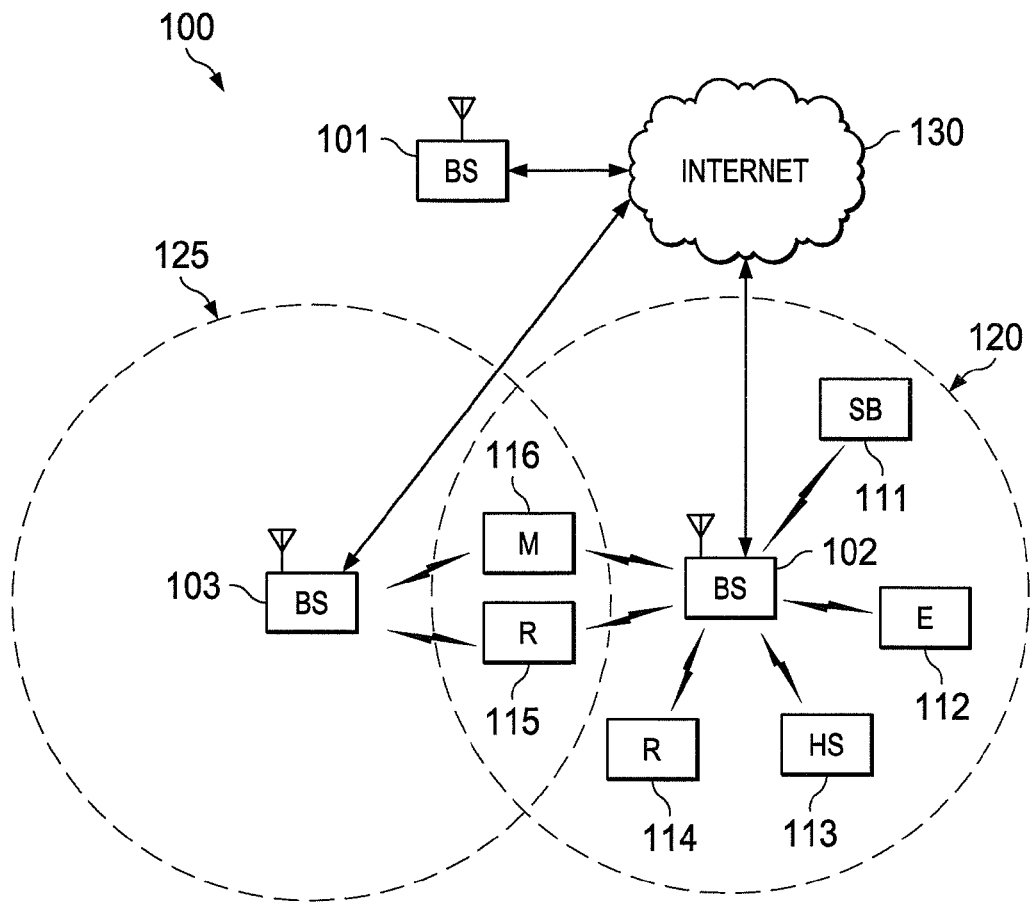
FIG. 1 illustrates an exemplary wireless network that transmits messages in the uplink according to the principles of this disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
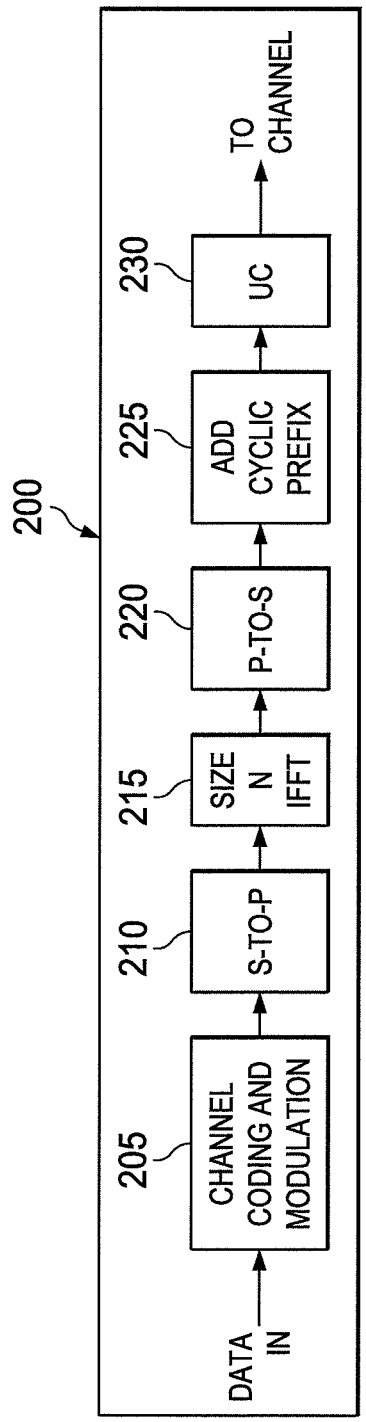
FIG. 2 is a high-level diagram of an orthogonal frequency division multiple access (OFDMA) transmitter according to one embodiment of this disclosure.
Figure 3:
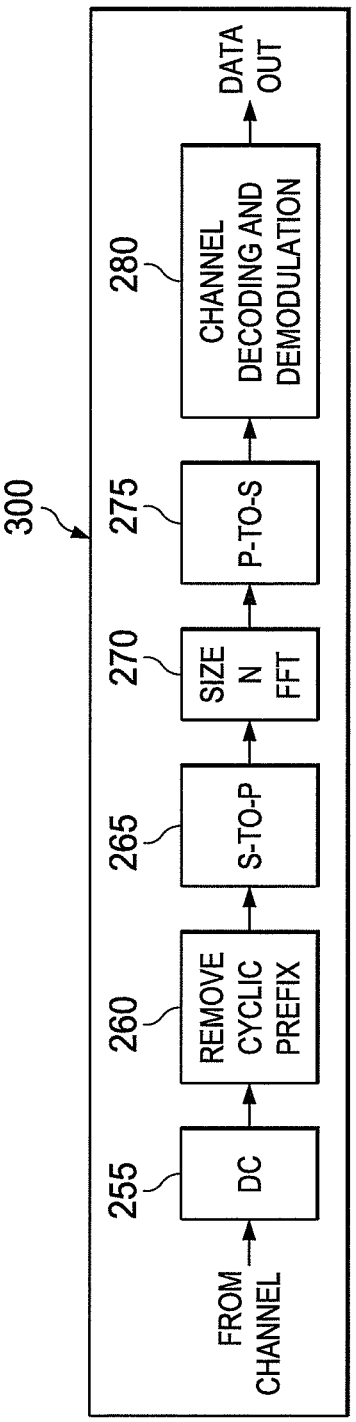
FIG. 3 is a high-level diagram of an OFDMA receiver according to one embodiment of this disclosure.

FIG. 2 is a high-level diagram of an orthogonal frequency division multiple access (OFDMA) transmit path 200. FIG. 3 is a high-level diagram of an orthogonal frequency division multiple access (OFDMA) receive path 300. In FIGS. 2 and 3, the OFDMA transmit path 200 is implemented in base station (BS) 102 and the OFDMA receive path 300 is implemented in subscriber station (SS) 116 for the purposes of illustration and explanation only. However, it will be understood by those skilled in the art that the OFDMA receive path 300 may also be implemented in BS 102 and the OFDMA transmit path 200 may be implemented in SS 116.

The transmit path 200 in BS 102 comprises a channel coding and modulation block 205, a serial-to-parallel (S-to-P) block 210, a Size N Inverse Fast Fourier Transform (IFFT) block 215, a parallel-to-serial (P-to-S) block 220, an add cyclic prefix block 225, an up-converter (UC) 230, a reference signal multiplexer 290, and a reference signal allocator 295.

The receive path 300 in SS 116 comprises a down-converter (DC) 255, a remove cyclic prefix block 260, a serial-to-parallel (S-to-P) block 265, a Size N Fast Fourier Transform (FFT) block 270, a parallel-to-serial (P-to-S) block 275, and a channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that, for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency. In some embodiments, reference signal multiplexer 290 is operable to multiplex the reference signals using code division multiplexing (CDM) or time/frequency division multiplexing (TFDM). Reference signal allocator 295 is operable to dynamically allocate reference signals in an OFDM signal in accordance with the methods and system disclosed in the present disclosure.

The transmitted RF signal arrives at SS 116 after passing through the wireless channel and reverse operations performed at BS 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

The transmitted signal in each downlink (DL) slot of a resource block is described by a resource grid of $N_{RB}^{DL} N_{sc}^{RB}$ subcarriers and $N_{symb}^{DL}$ OFDM symbols. The quantity $N_{RB}^{DL}$ depends on the downlink transmission bandwidth configured in the cell and fulfills $N_{RB}^{min,DL} \leq N_{RB}^{DL} \leq N_{RB}^{max,DL}$, where $N_{RB}^{min,DL}$ and $N_{RB}^{max,DL}$ are the smallest and largest downlink bandwidth, respectively, supported. In some embodiments, subcarriers are considered the smallest elements that are capable of being modulated.

In case of multi-antenna transmission, there is one resource grid defined per antenna port.

Each element in the resource grid for antenna port p is called a resource element (RE) and is uniquely identified by the index pair (k,l) in a slot where k=0, ..., $N_{RB}^{DL} N_{sc}^{RB}-1$ and l=0, ..., $N_{symb}^{DL}-1$ are the indices in the frequency and time domains, respectively. Resource element (k,l) on antenna port p corresponds to the complex value $a_{k,l}^{(p)}$. If there is no risk for confusion or no particular antenna port is specified, the index p may be dropped.

In LTE, DL reference signals (RSs) are used for two purposes. First, UEs measure channel quality information (CQI), rank information (RI) and precoder matrix information (PMI) using DL RSs. Second, each UE demodulates the DL transmission signal intended for itself using the DL RSs. In addition, DL RSs are divided into three categories: cell-specific RSs, multi-media broadcast over a single frequency network (MBSFN) RSs, and UE-specific RSs or dedicated RSs (DRSs).

Cell-specific reference signals (or common reference signals: CRSs) are transmitted in all downlink subframes in a cell supporting non-MBSFN transmission. If a subframe is used for transmission with MBSFN, only the first a few (0, 1 or 2) OFDM symbols in a subframe can be used for transmission of cell-specific reference symbols. The notation $R_p$ is used to denote a resource element used for reference signal transmission on antenna port p.

UE-specific reference signals (or dedicated RS: DRS) are supported for single-antenna-port transmission on the Physical Downlink Shared Channel (PDSCH) and are transmitted on antenna port 5. The UE is informed by higher layers whether the UE-specific reference signal is present and is a valid phase reference for PDSCH demodulation or not. UE-specific reference signals are transmitted only on the resource blocks upon which the corresponding PDSCH is mapped.

The time resources of an LTE system are partitioned into 10 msec frames, and each frame is further partitioned into 10 subframes of one msec duration each. A subframe is divided into two time slots, each of which spans 0.5 msec. A subframe is partitioned in the frequency domain into multiple resource blocks (RBs), where an RB is composed of 12 subcarriers.

Figure 4:
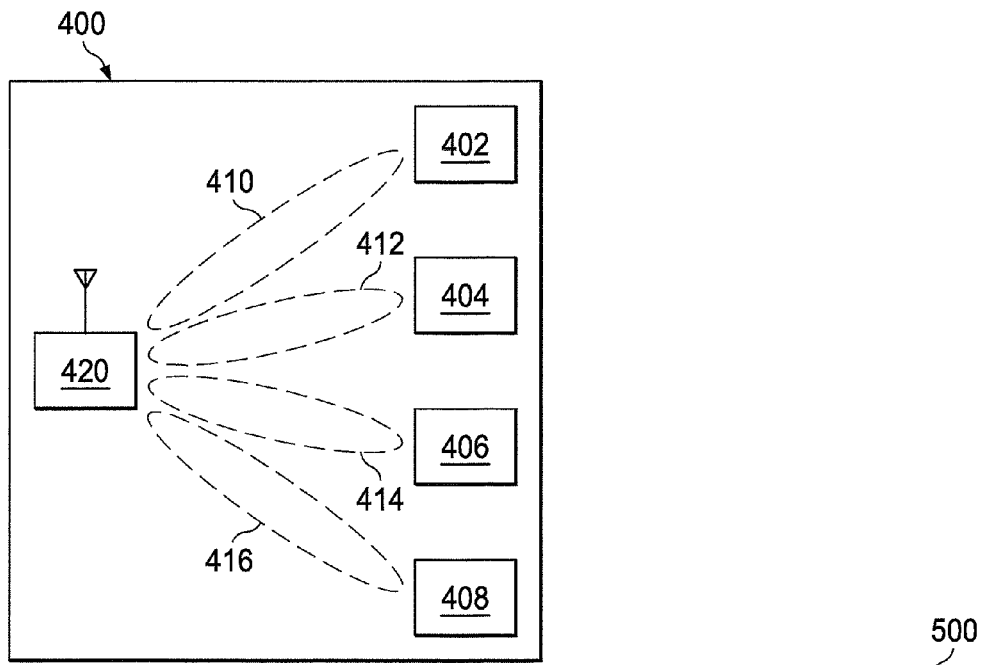
FIG. 4 illustrates a diagram of a base station in communication with a plurality of mobile stations according to an embodiment of this disclosure.

FIG. 4 illustrates a diagram 400 of a base station 420 in communication with a plurality of mobile stations 402, 404, 406, and 408 according to an embodiment of this disclosure.

As shown in FIG. 4, base station 420 simultaneously communicates with multiple of mobile stations through the use of multiple antenna beams, each antenna beam is formed toward its intended mobile station at the same time and same frequency. Base station 420 and mobile stations 402, 404, 406, and 408 are employing multiple antennas for transmission and reception of radio wave signals. The radio wave signals can be Orthogonal Frequency Division Multiplexing (OFDM) signals.

In this embodiment, base station 420 performs simultaneous beamforming through a plurality of transmitters to each mobile station. For instance, base station 420 transmits data to mobile station 402 through a beamformed signal 410, data to mobile station 404 through a beamformed signal 412, data to mobile station 406 through a beamformed signal 414, and data to mobile station 408 through a beamformed signal 416. In some embodiments of this disclosure, base station 420 is capable of simultaneously beamforming to the mobile stations 402, 404, 406, and 408. In some embodiments, each beamformed signal is formed toward its intended mobile station at the same time and the same frequency. For the purpose of clarity, the communication from a base station to a mobile station may also be referred to as downlink communication, and the communication from a mobile station to a base station may be referred to as uplink communication.

Base station 420 and mobile stations 402, 404, 406, and 408 employ multiple antennas for transmitting and receiving wireless signals. It is understood that the wireless signals may be radio wave signals, and the wireless signals may use any transmission scheme known to one skilled in the art, including an Orthogonal Frequency Division Multiplexing (OFDM) transmission scheme.

Mobile stations 402, 404, 406, and 408 may be any device that is capable receiving wireless signals. Examples of mobile stations 402, 404, 406, and 408 include, but are not limited to, a personal data assistant (PDA), laptop, mobile telephone, handheld device, or any other device that is capable of receiving the beamformed transmissions.

The use of multiple transmit antennas and multiple receive antennas at both a base station and a single mobile station to improve the capacity and reliability of a wireless communication channel is known as a Single User Multiple Input Multiple Output (SU-MIMO) system. A MIMO system promises linear increase in capacity with K where K is the minimum of number of transmit (M) and receive antennas (N) (i.e., K=min(M,N)). A MIMO system can be implemented with the schemes of spatial multiplexing, a transmit/receive beamforming, or transmit/receive diversity.

As an extension of SU-MIMO, multi-user MIMO (MU-MIMO) is a communication scenario where a base station with multiple transmit antennas can simultaneously communicate with multiple mobile stations through the use of multi-user beamforming schemes such as Spatial Division Multiple Access (SDMA) to improve the capacity and reliability of a wireless communication channel.

Figure 5:
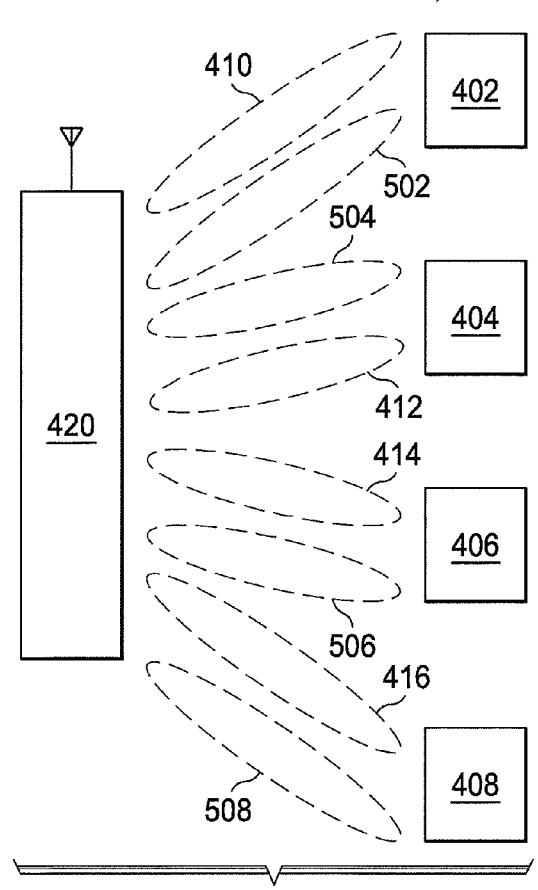
FIG. 5 illustrates a spatial division multiple access (SDMA) scheme according to an embodiment of this disclosure.

FIG. 5 illustrates an SDMA scheme according to an embodiment of this disclosure.

As shown in FIG. 5, base station 420 is equipped with 8 transmit antennas while mobile stations 402, 404, 406, and 408 are each equipped two antennas. In this example, base station 420 has eight transmit antennas. Each of the transmit antennas transmits one of beamformed signals 410, 502, 504, 412, 414, 506, 416, and 508. In this example, mobile station 402 receives beamformed transmissions 410 and 502, mobile station 404 receives beamformed transmissions 504 and 412, mobile station 406 receives beamformed transmissions 506 and 414, and mobile station 408 receives beamformed transmissions 508 and 416.

Since base station 420 has eight transmit antenna beams (each antenna beams one stream of data streams), eight streams of beamformed data can be formed at base station 420. Each mobile station can potentially receive up to 2 streams (beams) of data in this example. If each of the mobile stations 402, 404, 406, and 408 was limited to receive only a single stream (beam) of data, instead of multiple streams simultaneously, this would be multi-user beamforming (i.e., MU-BF).

Closed-loop fixed codebook transmit beamforming has been employed in many wireless system such as WIMAX or 3GPP LTE. Descriptions of such systems can be found, for example, in 3GPP TS36.211 "Evolved Universal Terrestrial Radio Access (E-UTRA): Physical Channel and Modulation" and IEEE 802.16e "Part 16: Air Interface for Fixed and Mobile Broadband Wireless Access Systems". Both references are hereby incorporated by reference into this disclosure as if fully set forth herein. In a closed loop codebook beamforming system, a transmitter sends a pilot signal or channel sounding signal to a receiver, and the receiver measures the channel information and calculates the best codeword within a codebook that best matches the observed channel. The best codeword information is then fed back to the transmitter. The transmitter then uses the best codeword information for transmit antenna beamforming.

This disclosure relates to the channel feedback aspects of LTE-Advanced (LTE-A) systems in support of single-user (SU-) and multi-user (MU-) multiple-input-multiple-output (MIMO) systems.

In LTE systems, channel estimation and demodulation are based on non-precoded common reference signals (CRS). Accordingly, the UE estimates the channel using the non-precoded reference signals and feeds back the suggested precoding vector and corresponding suggested modulation coding scheme (MCS) to the network. The UE selects the suggested precoding vector from a predetermined set of precoding vectors such that if the suggested precoding vector is applied at the network, the signal-to-interference plus noise ratio (SINR) at the UE will be maximized. The suggested precoding vector is, therefore, called the "precoding matrix index (PMI)" while the corresponding quantized SINR value is called the "channel quality index (CQI)". Since the downlink data channels are usually precoded, the network signals the corresponding precoder used for data channels to the UE to perform demodulation successfully. The information carrying the transmission precoding vector for the data channel is called the transmitted preceding matrix indicator ("TPMI") and is conveyed to the UE through the physical downlink control channel (PDCCH).

In LTE-Advanced systems, the demodulation of the data channel is based on precoded UE-specific reference signals. For example, the reference signals are precoded using the same precoder as the data channel as described in R1-090529 "Way forward on CoMP and MIMO DL RS", Outcome of ad hoc discussions, January 2009, and R1-091066 "Way forward on downlink reference signals for LTE-A", CATT, CMCC, Ericsson, Huawei, LGE, Motorola, Nokia, Nokia Siemens Networks, Nortel, Panasonic, Philips, Qualcomm Europe, Samsung, Texas Instruments, March 2009. Both references are hereby incorporated by reference into this disclosure as if fully set forth herein.

RSs targeting PDSCH demodulation (for LTE-A operation) are UE specific and transmitted only in scheduled RBs and the corresponding layers. Different layers can target the same or different UEs. The design principle is an extension of the concept of Rel-8 UE-specific RS (used for beamforming) to multiple layers. RSs on different layers are mutually orthogonal. RS and data are subject to the same precoding operation. Complementary use of Rel-8 CRS by the UE is not precluded.

In LTE-Advanced systems, the network does not need to convey the precoder to the UE for demodulation purpose and thus can use any precoding vector. Accordingly, the objective of the UE channel feedback is to inform the network about the channel characteristic instead of suggesting a precoding vector as with LTE systems.

Currently, in LTE systems, codebook-based PMI/CQI feedback is adopted mainly because the feedback is optimized for SU-MIMO operations. Codebook-based feedback gives an acceptable trade-off between overhead and performance for SU-MIMO systems and is the working assumption for the feedback format of the SU-MIMO in LTE-A systems as described, for example, in R1-092274 "Summary from MIMO AH Session", AH Chair (Samsung), May 2009, which is hereby incorporated by reference into this disclosure as if fully set forth herein.

However, SU-MIMO technology may not be sufficient to meet IMT-Advanced targets. Furthermore, advanced intra-cell MU-MIMO and coordinated multipoint (CoMP) transmission are the crucial technologies for LTE-A to meet the targets of International Mobile Telecommunications-Advanced (IMT-A) systems in certain channel models. This requires a new design of the channel feedback for LTE-A systems to support the operation of intra-cell MU-MIMO and its possible extension to CoMP.

This disclosure provides a system and method to provide feedback channel information to support intra-cell SU-MIMO, intra-cell MU-MIMO and possible extension to CoMP.

In order to perform multi-user MIMO, a network has to have knowledge of the wireless channel. In general, there are two major components of channel feedback: spatial channel feedback and channel quality feedback. Spatial channel feedback relates to the feedback of the spatial direction of the channel, and channel quality feedback relates to the strength of the channel in different directions. For example, Rel. 8 PMI can be classified into the category of spatial channel feedback while CQI falls in the class of channel quality feedback.

In one embodiment of this disclosure, the UE feedbacks the quantized principal right-singular vector(s) of the averaged channel matrix or the quantized principal eigenvector(s) of the averaged covariance matrix as spatial channel feedback. For the channel quality feedback, the UE feedbacks the quantization of the corresponding principal right-singular value(s) or the corresponding principal eigenvector(s) normalized towards the variance of interference plus noise.

After performing channel estimation, the UE obtains an estimate of the channel matrix for each subcarrier. Let $H_i$ be the channel matrix of subcarrier i.

For example, the averaged channel matrix can be obtained by averaging the channel matrix over a particular set of subbands or the whole bandwidth as shown in Equation 1 below:

$$H = \frac{\sum_{i=1}^{N} H_i}{N}, \quad [\text{Eqn. 1}]$$

where 1, . . . , N are the subcarrier indices of the target bandwidth.

For example, the averaged covariance matrix can be the averaged short-term/instantaneous covariance matrix obtained through averaging the short-term/instantaneous covariance matrix over a particular set of subbands or the whole bandwidth. The short-term/instantaneous covariance matrix can be computed as $H^*_i \times H_i$ as shown in Equation 2 below:

$$H = \frac{\sum_{i=1}^{N} H_i^* x H_i}{N}, \quad [\text{Eqn. 2}]$$

where 1, . . . , N are the subcarrier indices of the target bandwidth.

After obtaining the averaged channel matrix, the UE computes the right-singular vector(s) of the corresponding matrix. In a particular embodiment, the UE feedbacks the principal right-singular vector corresponding to the largest singular value or multiple right-singular vectors jointly or individually.

For example, for the case where there are 4 Tx antennas at the eNodeB and 2 Tx antennas at the UE, the singular value decomposition (SVD) of the corresponding average channel matrix can be illustrated as shown in Equation 3 below:

$$H = \frac{\sum_{i=1}^{N} H_i}{N} = [\vec{s_1}\vec{s_2}] \begin{bmatrix} \lambda_1 & 0 & 0 & 0 \\ 0 & \lambda_2 & 0 & 0 \end{bmatrix} \begin{bmatrix} \vec{v_1^*} \\ \vec{v_2^*} \\ \vec{v_3^*} \\ \vec{v_4^*} \end{bmatrix}, \quad [\text{Eqn. 3}]$$

where $\vec{s}_i$ is the left-singular vector of dimension of 2×1, $\lambda_1$ is the singular value, and $\vec{v}_i$ is the right-singular vector of dimension of 4×1. Assuming $\lambda_1 \geq \lambda_2$, the dominant singular value is then $\lambda_1$, and the corresponding dominant right-singular vector is then $\vec{v}_1$.

For the same system, the UE can also perform eigenvalue decomposition of the covariance matrix as shown in Equation 4 below:

$$R = \frac{\sum_{i=1}^{N} H_i^* x H_i}{N} = [\vec{v_1}\vec{v_2}\vec{v_3}\vec{v_4}] \begin{bmatrix} \lambda_1 & 0 & 0 & 0 \\ 0 & \lambda_2 & 0 & 0 \\ 0 & 0 & 0 & 0 \\ 0 & 0 & 0 & 0 \end{bmatrix} \begin{bmatrix} \vec{v_1^*} \\ \vec{v_2^*} \\ \vec{v_3^*} \\ \vec{v_4^*} \end{bmatrix}, \quad [\text{Eqn. 4}]$$

where $\vec{v}_i$ is the eigenvector of dimension of 4×1, and $\lambda_i$ is the corresponding eigen-value. Assuming $\lambda_1 \geq \lambda_2$, the dominant eigenvalue is then $\lambda_1$, and the corresponding dominant eigenvector is $\vec{v}_1$.

In particular embodiments, the UE quantizes the right-singular eigenvectors one by one according to a predetermined order.

For example, the order can be most important right-singular vector first then the second most important right-singular vector and so forth.

In the example where there are 4 Tx antennas at the eNodeB and 2 Tx antennas at the UE as described above, the UE first quantizes $\vec{v}_1$ then quantizes $\vec{v}_2$ as shown in Equation 5 below:

$$\tilde{v}_1 = \arg\max_{u \in C} \|u^* \vec{v}_1\|_D^2,$$

and $$\tilde{v}_2 = \arg\max_{u \in C} \|u^* \vec{v}_2\|_D^2, \quad [\text{Eqn. 5}]$$

where C is a codebook of 4×1 vectors and $\| \|_D$ is some distance measure. The UE then feeds back the indices of $\tilde{v}_1$ and $\tilde{v}_2$ in the codebook to the network.

In other embodiments, the UE may quantize the right-singular eigenvectors jointly based on a codebook.

In the example where there are 4 Tx antennas at the eNodeB and 2 Tx antennas at the UE as described above, the UE quantizes $[\vec{v}_1 \vec{v}_2]$ jointly as shown in Equation 6 below:

$$[\tilde{v}_1 \tilde{v}_2] = \arg\max_{u \in C} \|u^*[\vec{v}_1 \vec{v}_2]\|_D, \quad [\text{Eqn. 6}]$$

where C is a codebook of 4×2 vectors and $\| \|_D$ is some distance measure. The UE then feeds back the index in the codebook to the network.

The same procedure can be performed based on the averaged short-term/instantaneous covariance matrix.

As for the channel quality feedback, in some embodiments, the corresponding singular value(s) and eigenvalue(s) are quantized based on a probability density function.

In one embodiment of this disclosure, the UE feeds back only N right-singular vectors or N eigen-vectors even when the actual rank of the channel is more than N. One example of this case is when the UE only feeds back the eigenvectors (or right-singular vectors) corresponding to the N biggest eigenvalues (or singular values) as the spatial channel feedback.

The N eigenvectors (or right-singular vectors) can be fed back jointly or separately as illustrated in the previous embodiment.

In particular embodiments, the N eigenvalues (or singular values) are normalized towards the variance of interference plus noise before being fed back to the network.

For example, when N=2, let $\lambda_1$ and $\lambda_2$ be the two biggest normalized eigenvalues (or singular values) and let $v_1$ and $v_2$ be the corresponding eigenvectors (or right-singular vectors) with $\lambda_1 \geq \lambda_2$. There are many ways to feedback the two normalized eigenvalues (or singular values).

For example, the UE can feedback the quantized version of any two components of the following list:

$\lambda_1$, $\lambda_2$, $\lambda_2/\lambda_1$, $\lambda_1+\lambda_2$, and $\lambda_1-\lambda_2$.

In general, feeding back two non-trivial functions of $\lambda_1$ and $\lambda_2$ can be sufficient for the network to compute $\lambda_1$ and $\lambda_2$, respectively.

In one embodiment of this disclosure, the UE feeds back the two eigenvectors (or right-singular vectors) corresponding to the biggest two eigenvalues (or singular values) for spatial channel feedback. For the channel quality feedback, the UE feeds back the quantization of the biggest normalized eigenvalue (or singular value) together with the ratio between the second largest eigenvalue (or singular value) and the first largest eigenvalue (or singular value).

Furthermore, the eigenvectors (or right-singular vectors) are quantized using codebooks with different size, and the size of the codebook depends on the ratio between the second largest eigenvalue (or singular value) and the first largest eigenvalue (or singular value).

FIG. 6 illustrates a table 600 depicting a relationship between a payload size of a codebook and a ratio between a second largest eigenvalue (or singular value) and a first largest eigenvalue (or singular value) according to an embodiment of this disclosure.

As shown in table 600, the feedback state depends on the range into which the ratio of $\lambda_2/\lambda_1$ falls. Based on the state, the UE feeds back an indication that informs the network of the configuration of the codebook that the UE is using to quantize the different eigenvectors (or right-singular vectors).

In one embodiment of this disclosure, eigenvectors (or right-singular vectors) are fed back individually according to a predetermined order. The dimensions of the codebooks used to successively quantize the eigenvectors (or right-singular vectors) can be successively reduced.

For example, for a system assuming 4 transmit antennas at the eNodeB, the codebook (CB1) for quantizing the first eigenvector (or right-singular vector) will have codewords of dimension 4×1, while the codebook (CB2) for quantizing the second eigenvector (or right-singular vector) will have codewords of dimension 3×1, and so forth.

For the exemplary system having 4 Tx antennas at the eNodeB and 2 Tx antennas at the UE as described above, in one embodiment, the UE first constructs an eigenvector matrix (V) by placing the eigenvectors next to each other. Starting from there, dimension reduction technology based on householder transformation can be illustrated as shown in Equation 7 below:

$$V = [\vec{v_1} \vec{v_2}] = \begin{bmatrix} v_{11} & v_{12} \\ v_{21} & v_{22} \\ v_{31} & v_{32} \\ v_{41} & v_{42} \end{bmatrix} \implies F_1 V = \begin{bmatrix} e^{j\phi_1} & 0 \\ 0 & \tilde{v}_{21} \\ 0 & \tilde{v}_{22} \\ 0 & \tilde{v}_{23} \end{bmatrix}.$$ [Eqn. 7]

Dimension: 4 x 1        Dimension: 3 x 1

At the eNodeB, a 4×2 matrix representing the two eigenvectors (or right-singular vectors) can be reconstructed using Householder transformation on the first 4×1 codeword from the first codebook (CB1) and the second 3×1 codeword from the second codebook (CB2).

In one embodiment of this disclosure, a feedback framework supports both single-user MIMO (SU-MIMO) and multi-user MIMO (MU-MIMO) systems. This disclosure provides several embodiments of a feedback channel (spatial channel feedback and channel quality feedback) supporting both SU-MIMO and MU-MIMO systems.

In one embodiment, the network semi-statically or dynamically configures the maximum rank of the channel feedback that the UE should report. In the case of semi-static configuration, the network could signal the maximum rank through higher layer signaling (e.g., Radio Resource Control (RRC) signaling). In the case of dynamic configuration, the network could signal the maximum rank in downlink control information (DCI) through downlink control channels (e.g., PDCCH) or downlink shared channels (e.g., PDSCH).

One example of dynamic configuration is to add rank indication in the DCI format 0 of the PDCCH.

After receiving the maximum rank for the channel feedback, the UE feeds back the eigenvectors (or right-singular vectors) and the corresponding eigenvalues (or singular values) using the methods described in the previous embodiments, together with the rank information to the network.

In some embodiments, the rank that the UE feeds back to the network is the number of eigenvectors (or right-singular vectors) in the feedback report. In particular embodiments, this rank is less than or equal to the actual rank of the channel and the maximum rank of the channel feedback indicated by the network.

In one embodiment, the feedback for SU-MIMO transmission is multiplexed together with the feedback for MU-MIMO transmission.

For example, the feedback for SU-MIMO transmission could be the PMI/CQI/RI based feedback, and the feedback for MU-MIMO transmission could be the eigenvector or eigenvalues (or right-singular vectors, singular values) based feedback as mentioned in the previous embodiments.

In this embodiment, the UE would send PMI based feedback for SU-MIMO transmission periodically while aperiodically or periodically (with different periodicity) sending eigenvector/eigenvalue (or right-singular vector/singular value) based feedback.

FIG. 7 illustrates a timeline 700 in which feedback for SU-MIMO transmission is multiplexed together with feedback for MU-MIMO transmission according to an embodiment of this disclosure.

In this embodiment, a UE is configured by higher layers to periodically feedback different CQI, PMI and RI on the PUCCH using different reporting modes. Furthermore, the UE is configured to periodically feedback eigenvector based feedback for MU-MIMO with a different periodicity. For example, as shown in timeline 700, the periodicity of feeding back SU-MIMO based feedback is P subframes while the periodicity of feeding back the MU-MIMO based feedback is MP subframes.

FIG. 8 illustrates a timeline 800 in which feedback for SU-MIMO transmission is multiplexed together with feedback for MU-MIMO transmission according to another embodiment of this disclosure.

In the embodiment shown in FIG. 8, at the subframe when the UE is configured to send the eigenvector/eigenvalue (or right-singular vector/singular value) based feedback for MU-MIMO transmission, the UE can still feedback the PMI/CQI/RI based feedback for SU-MIMO transmission.

In another embodiment, at the subframe when the UE is configured to feedback the eigenvector/eigenvalue (or right-singular vector/singular value) based feedback for MU-MIMO transmission, the UE does not feedback the PMI/CQI/RI based feedback for SU-MIMO transmission as illustrated in FIG. 7.

In yet another embodiment, the UE periodically feeds back the quantized version of a set of eigenvector (or right-singular vector) and eigenvalue (or singular value). Quantization of the other eigenvectors (or right-singular vectors) and eigenvalues (or singular values) or other set of eigenvectors (or right-singular vectors) and eigenvalues (or singular values) can be fed back using a different periodicity or aperiodically.

In such an embodiment, the quantization of different eigenvectors (or right-singular vectors) and eigenvalues (or singular values) are multiplexed over time.

For example, the UE feeds back the quantization of the principal (strongest) eigenvector (or right-singular vector) and eigenvalue (or singular value), i.e, the quantization of $\lambda_1$ and $v_1$, periodically, while the other eigenvector (or right-singular vector) and eigenvalue (or singular value) are fed back less frequently. For example, for the case where the UE is configured to also send back the quantization of $\lambda_2$ and $v_2$, the quantization of $\lambda_2$ and $v_2$ could be sent less frequently.

FIG. 9 illustrates a timeline 900 in which feedback for SU-MIMO transmission is multiplexed together with feedback for MU-MIMO transmission according to yet another embodiment of this disclosure.

In the embodiment shown in FIG. 9, a UE is configured by higher layers to periodically feedback different quantization of the principal eigenvector (or right-singular vector) and eigenvalue (or singular value) on the PUCCH using different reporting modes. Furthermore, the UE is configured to periodically feedback the quantization of other eigenvectors/eigenvalues (right-singular vectors/singular values) using a different periodicity. In one example, the periodicity of the feedback of the principal eigenvector (or right-singular vector) and eigenvalue (or singular value) is P subframes while the periodicity of the feedback the other eigenvectors/eigenvalues (right-singular vectors/singular values) is NP subframes.

FIG. 10 illustrates a timeline 1000 in which feedback for SU-MIMO transmission is multiplexed together with feedback for MU-MIMO transmission according to a further embodiment of this disclosure.

In the embodiment shown in FIG. 10, at the subframe when a UE is configured to feedback the other eigenvectors/eigenvalues (right-singular vectors/singular values), the UE can still feedback the principal eigenvector (or right-singular vector) and eigenvalue (or singular value).

In still yet another embodiment, at the subframe when a UE is configured to feedback the other eigenvectors/eigenvalues (right-singular vectors/singular values), the UE does not feedback the principal eigenvector (or right-singular vector) and eigenvalue (or singular value) as illustrated in FIG. 9.

FIG. 11 illustrates a table 1100 depicting use of a one-bit indicator to indicate a dominant eigen-direction of a channel according to an embodiment of this disclosure.

In this embodiment, the UE feeds back the CQI/PMI/RI together with an indicator. The indicator indicates which M codewords of the PMI correspond to the M strongest eigen-directions of the channel (or effective channel after receiver processing). In the example shown in table 1100, assume a UE has 4 Tx antennas and the eNB has 4 Tx antennas while the UE feeds back rank 2 transmission using the PMI: [$w_1$, $w_2$] where $w_1$ and $w_2$ are two 4×1 column vectors, then a one-bit indication can be used to indicate the dominant eigen-direction of the channel.

FIG. 12 illustrates a table 1200 correlating different feedback contents with state numbers according to an embodiment of this disclosure.

As noted earlier, in order to perform multi-user MIMO, the network has to have sufficient information to perform multi-user pairing, multi-user CQI prediction, and multi-user scheduling. In one embodiment of this disclosure, a UE is configured by a network to feedback different contents for an aperiodic CQI reporting by dynamic signalling through downlink control information.

As shown in FIG. 12, in some embodiments, the different feedback contents are SU-MIMO CQI/PMI/RI feedback and MU-MIMO feedback.

FIG. 13 illustrates a table 1300 correlating different feedback contents with state numbers according to another embodiment of this disclosure.

In one embodiment, the different feedback contents are generated by different maximum rank assumptions. Upon receiving a maximum rank information from a network, a UE would report CQI/PMI/RI corresponding to a rank up to the maximum rank. The UE is not allowed to report CQI/PMI/RI corresponding to a rank greater than the maximum rank.

In another embodiment, when the rank of the feedback is greater than the maximum configured rank, the UE feedbacks two reports, one report contains CQI/PMI/RI corresponding to a rank up to the maximum rank and the other report contains CQI/PMI/RI corresponding to the rank of the feedback, which is greater than the maximum configured rank.

Table 1300 shows two states for this maximum feedback rank information. In this embodiment, State 4 may mandate a specific UE behavior. In one example, when a UE is indicated State 4, the UE is required to assume a maximum-ratio-combining (MRC) receiver to generate CQI for a codeword corresponding to a column in a precoding matrix.

In Rel. 8, DCI format 0 is used to trigger an aperiodic CQI reporting. In the current DCI format 0, there exist at least one padding bit and one CQI request bit for all system bandwidth configurations.

FIG. 14 illustrates a table 1400 mapping two states to codepoints in a DCI format according to an embodiment of this disclosure.

FIG. 15 illustrates a table 1500 mapping two states to codepoints in a DCI format according to another embodiment of this disclosure.

In some embodiments, the network indicates a particular state among a plurality of possible states for feedback contents to a UE using two codepoints among those codepoints generated by two bits: one from the at least one padding bit, the other from the one CQI request bit. Possible ways of indicating feedback contents are shown in tables 1400 and 1500. Of course, one of ordinary skill in the art would recognize that a codepoint, such as (CQI request, padding)=(0, 1), can be used for indicating information other than non-contiguous SRS indication and that tables 1400 and 1500 show just one example of using codepoint (0,1).

FIG. 16 illustrates a table 1600 mapping feedback types to PUSCH reporting modes according to an embodiment of this disclosure.

In an embodiment of this disclosure, a UE is configured by a network to feedback different contents for an aperiodic CQI reporting through a higher layer signalling.

In some embodiments, new feedback modes are defined by placing an additional constraint on a maximum feedback rank (e.g., RI≤2 or no restriction on RI). In one example, new feedback modes 1-2', 2-2', 3-1' are the same as feedback modes 1-2, 2-2, 3-1 defined in 36.213 Standard, v.8.8.0, "E-UTRA; Physical Layer Procedures", which is hereby incorporated by reference into this disclosure as if fully set forth herein, and shown in table 1600 in terms of PMI feedback type and PUSCH CQI feedback type, except that the new modes place a restriction on the maximum feedback rank (e.g., RI≤2). The higher layer signalling indicates to a UE whether to feedback according to one of the feedback modes 1-2, 2-2, 3-1 or one of the feedback modes 1-2', 2-2', 3-1'.

In other embodiments, when the rank of the feedback is greater than the maximum configured rank, the UE feedbacks two reports, one report contains CQI/PMI/RI corresponding to a rank up to the maximum rank and the other report contains CQI/PMI/RI corresponding to the rank of the feedback, which is greater than the maximum configured rank.

In an embodiment of this disclosure, periodic CQI reporting enables both SU-MIMO and MU-MIMO operation based on SU-MIMO CQI/PMI/RI feedback.

In one embodiment of this disclosure, a network configures multiple feedback processes by higher layer signaling. A feedback process is determined by the feedback periodicity ($N_P$), offset ($N_{OFFSET,CQI}$, $N_{OFFSET,RI}$) and PUCCH resources. In such an embodiment, the network configures $N_P$, $N_{OFFSET,CQI}$, $N_{OFFSET,RI}$ and a PUCCH resource for each feedback process via a higher-layer signalling.

In some embodiments, the network may configure up to two feedback processes for a UE, where the two feedback processes are:

one feedback process targeting the performance optimization of the SU-MIMO transmission (which may imply up to rank 8 SU-MIMO CQI/PMI/RI feedback or State 1 or State 3); and one feedback process targeting the performance optimization of the MU-MIMO transmission (which may imply up to rank 2 SU-MIMO CQI/PMI/RI feedback or State 2 or State 4).

The two feedback processes can be configured either by one higher-layer signaling or two separate higher-layer signaling.

One higher-layer signaling (or joint indication) initiates multiple feedback processes. In one embodiment, one higher layer signaling explicitly indicates all the parameters, $N_P$, $N_{OFFSET,CQI}$, $N_{OFFSET,RI}$ and a PUCCH resource, for each of the multiple feedback processes. In another embodiment, one higher layer signaling explicitly indicates one set of parameters, $N_P$, $N_{OFFSET,CQI}$, $N_{OFFSET,RI}$ and a PUCCH resource, for only one feedback process of the multiple feedback processes. The other set of parameters for the other feedback processes is implicitly derived from the signaled set of parameters.

In the other embodiment, a separate higher-layer signaling (or separate indication) for initiating each feedback process is sent by the eNodeB.

When a State-4 (SU-MIMO CQI/PMI/RI Feedback with RI≤2) feedback process is initiated and a UE wants to report a rank-2 information, a UE's feedback contents can be one of these:

Rel. 8 type rank 2 SU-MIMO CQI/PMI;
2 Rel. 8 type rank 1 CQI/PMI;
2 Rel. 8 type rank 1 PMI and 1 Rel. 8 rank 1 CQI and 1 differential CQI; or
1 Rel. 8 type rank 1 PMI, 1 differential PMI, 1 Rel. 8 rank 1 CQI, and 1 differential CQI.

In LTE-A systems, there are two possible ways to extend the payload size of PUCCH (PUCCH payload extension). One way is to use two Rel. 8 type of PUCCH resources in the same subframe while the other is to extend the payload size of PUCCH by introducing a new PUCCH resource.

In one embodiment of this disclosure, a feedback mode is configured by higher layer signaling via a joint indication method. A higher layer signaling conveys one periodicity (P) and one offset ($N_{OFFSET,CQI}$, $N_{OFFSET,RI}$) that can be used for both types of CQI reports: one type is based on State 3 and the other is based on State 4.

FIG. 17 illustrates a first timeline 1701 of a first PUCCH resource carrying a first CQI report and a second timeline 1703 of a second PUCCH resource carrying a second CQI report at a same periodicity according to an embodiment of this disclosure.

Two methods of multiplexing the two CQI reports transmitted in same time resources are provided in this disclosure.

In one method, the higher layer signaling assigns two PUCCH resources for the two CQI reports. In one example, a PUCCH resource independently carries a CQI report. This method is illustrated in FIG. 17. In another example, the information bits of the two CQI reports are jointly encoded by a (40, 2A) code, and 20 QPSK symbols are mapped to two PUCCH resources, 10 in each PUCCH resource.

In another method, the higher layer signaling assigns a new PUCCH resource (e.g., PUCCH format 3). In such an embodiment, information bits in the two sets of CQI/PMI/RI are jointly encoded and carried via a new PUCCH resource.

In an embodiment of this disclosure, one higher layer signaling configures joint allocation of the feedback process resources. The joint allocation determines the feedback periodicities (P,MP) for the above mentioned two processes, and one offset ($N_{OFFSET,CQI}$, $N_{OFFSET,RI}$). Hence, the higher-layer signaling transmits bits indicating values for P, M, $N_{OFFSET,CQI}$, and $N_{OFFSET,RI}$ to a UE.

Figure 18:
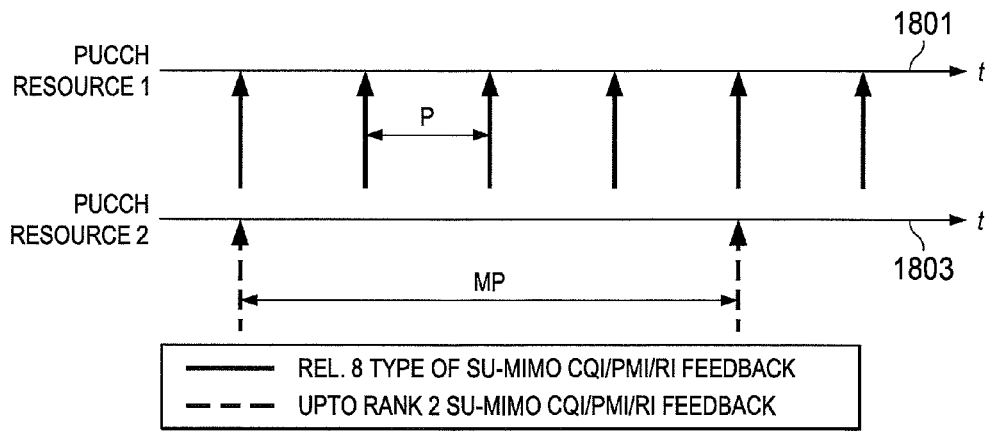
FIG. 18 illustrates a first timeline of a first PUCCH resource carrying a first feedback report and a second timeline of a second PUCCH resource carrying a second feedback report at a different periodicity according to an embodiment of this disclosure.

FIG. 18 illustrates a first timeline 1801 of a first PUCCH resource carrying a first feedback report and a second timeline 1803 of a second PUCCH resource carrying a second feedback report at a different periodicity according to an embodiment of this disclosure.

As shown in FIG. 18, higher layer signaling assigns two PUCCH resources for the two feedback reports.

In another method, the higher layer signaling signals only one Rel-8 PUCCH resource. The feedback process based on State (or SU-MIMO CQI/PMI/RI feedback) uses the one PUCCH resource. When both feedback processes are scheduled in a same subframe, the information bits of the two CQI reports are jointly encoded by a (40, 2A) code, and 20 QPSK symbols are mapped to two PUCCH resources, 10 in each PUCCH resource. In particular embodiments, the one Rel-8 PUCCH resource may implicitly indicate another Rel-8 PUCCH resource in those subframes where both feedback processes collide.

Figure 19:
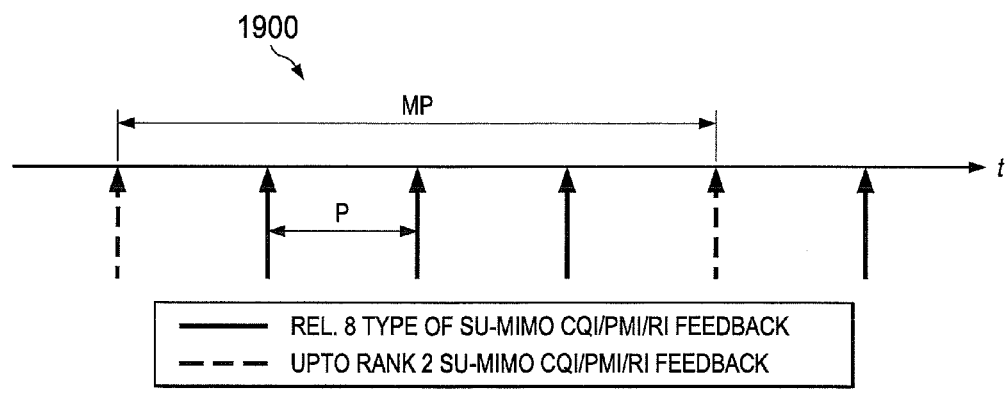
FIG. 19 illustrates a timeline depicting periodic feedback reporting with one PUCCH resource according to an embodiment of this disclosure.

FIG. 19 illustrates a timeline 1900 depicting periodic feedback reporting with one PUCCH resource according to an embodiment of this disclosure.

In an embodiment of this disclosure, one higher layer signaling configures two periodicities (P,MP), one offset ($N_{OFFSET,CQI}$, $N_{OFFSET,RI}$) and only one Rel. 8 PUCCH resource. In such an embodiment, only one CQI report can be fed back in a subframe. When two feedback processes collide (or when a subframe has two CQI reports scheduled), State-3 feedback is dropped. As shown in FIG. 19, State-3 feedback is dropped in the collided subframes.

Figure 20:
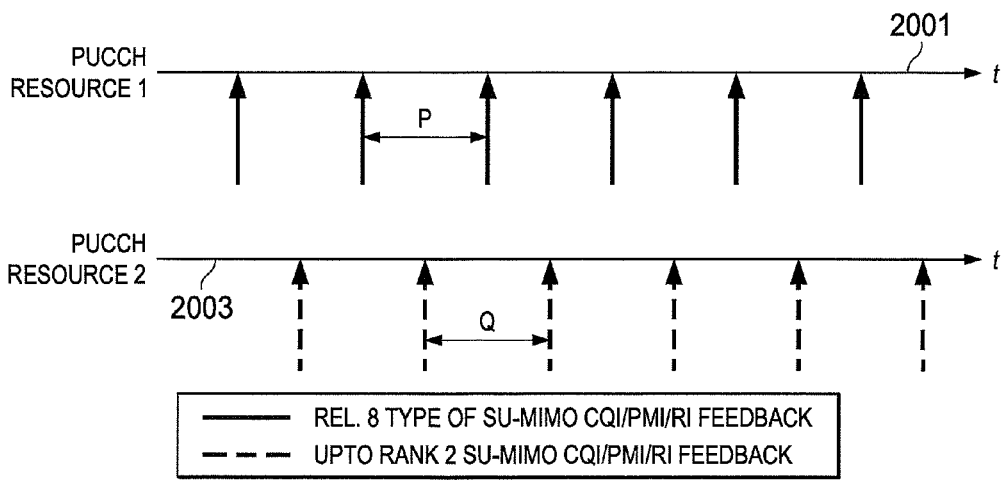
FIG. 20 illustrates a first timeline of a first PUCCH resource carrying a first feedback report and a second timeline of a second PUCCH resource carrying a second feedback report using different offsets according to an embodiment of this disclosure.

FIG. 20 illustrates a first timeline 2001 of a first PUCCH resource carrying a first feedback report and a second timeline 2003 of a second PUCCH resource carrying a second feedback report using different offsets according to an embodiment of this disclosure.

In an embodiment of this disclosure, one higher layer signaling configures two periodicities (P,MP) and two offsets ($N_{OFFSET,CQI1}$, $N_{OFFSET,RI1}$, $N_{OFFSET,CQI2}$ and $N_{OFFSET,RI2}$) for the two feedback processes. In particular embodiments, the higher layer signaling configures PUCCH resources using one of the three alternatives: (1) one Rel-8 PUCCH resource, (2) two Rel-8 PUCCH resources, and (3) one new PUCCH resource (e.g., PUCCH format 3). When two Rel-8 PUCCH resources are assigned by the higher layer signaling, the two CQI reports are separately fed back in the two resources as illustrated in FIG. 20.

Of course, one of ordinary skill in the art would recognize that the above mentioned embodiments on the periodic CQI reporting can be reused under the situation where "one higher layer signaling" is changed to "multiple higher layer signalings". For example, for the feedback process illustrated in FIG. 20, two higher layer signalings can be used to configure each of the feedback processes.

Figure 21:
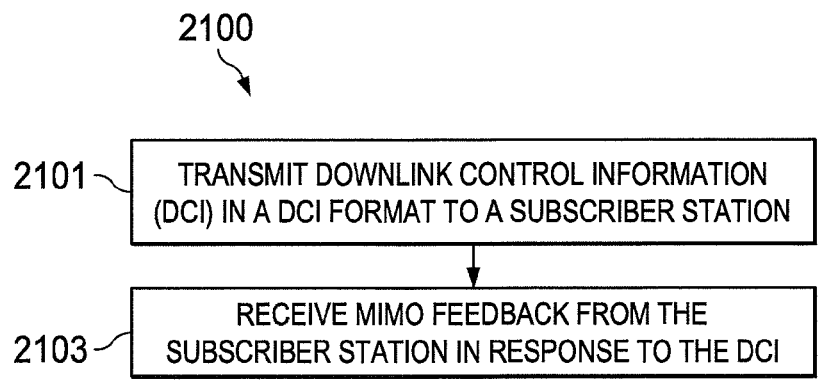
FIG. 21 illustrates a method of operating a base station according to an embodiment of this disclosure.

FIG. 21 illustrates a method 2100 of operating a base station according to an embodiment of this disclosure.

As shown in FIG. 21, method 2100 includes transmitting downlink control information in a downlink control information (DCI) format to a subscriber station (block 2101) and receiving multiple-input multiple-output (MIMO) feedback from the subscriber station in response to the downlink control information (block 2103. The MIMO feedback from the subscriber station is determined by two or more codepoints in the DCI format, and one of the two or more codepoints indicates a rank-limited single user multiple-input multiple-output (SU-MIMO) feedback corresponding to a rank up to a maximum rank.

Figure 22:
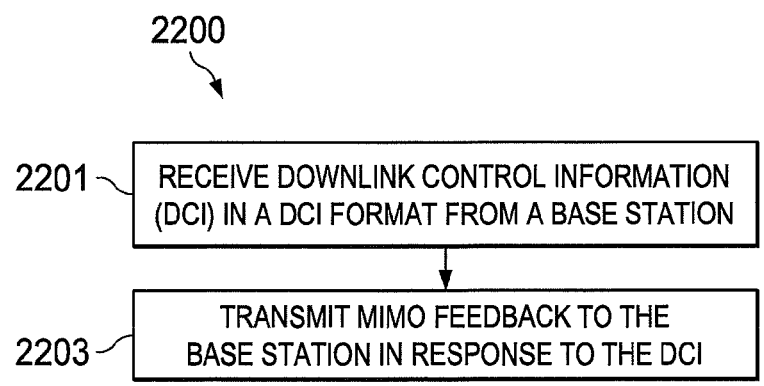
FIG. 22 illustrates a method of operating a subscriber station according to an embodiment of this disclosure.

FIG. 22 illustrates a method 2200 of operating a subscriber station according to an embodiment of this disclosure.

As shown in FIG. 22, method 2200 includes receiving downlink control information in a downlink control information (DCI) format from a base station (block 2201) and transmitting multiple-input multiple-output (MIMO) feedback to the base station in response to the downlink control information (block 2203). The MIMO feedback from the subscriber station is determined by two or more codepoints in the DCI format, and one of the two or more codepoints indicates a rank-limited single user multiple-input multiple-output (SU-MIMO) feedback corresponding to a rank up to a maximum rank.

Figure 23:
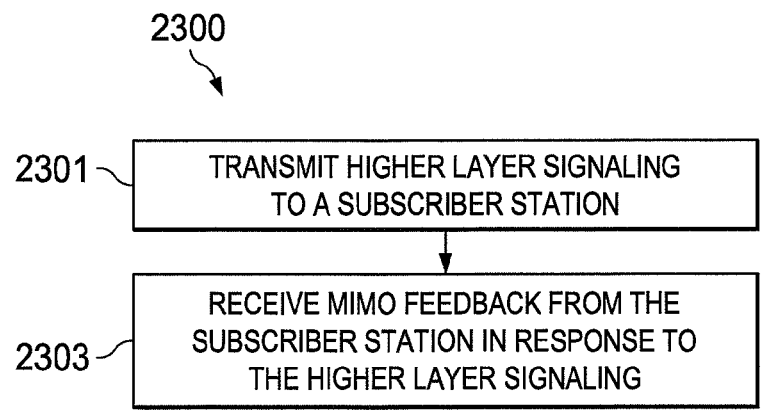
FIG. 23 illustrates a method of operating a base station according to another embodiment of this disclosure.

FIG. 23 illustrates a method 2300 of operating a base station according to another embodiment of this disclosure.

As shown in FIG. 23, method 2300 includes transmitting a higher layer signaling to a subscriber station (block 2301), and receiving multiple-input multiple-output (MIMO) feedback from the subscriber station in response to the higher layer signaling (block 2303). The higher layer signaling indicates a periodicity, an offset, and a physical uplink control channel (PUCCH) resource for each of two or more MIMO feedback processes used for the MIMO feedback by the subscriber station. One of the two or more MIMO feedback processes is a rank-limited single user multiple-input multiple-output (SU-MIMO) feedback process corresponding to a rank up to a maximum rank.

Figure 24:
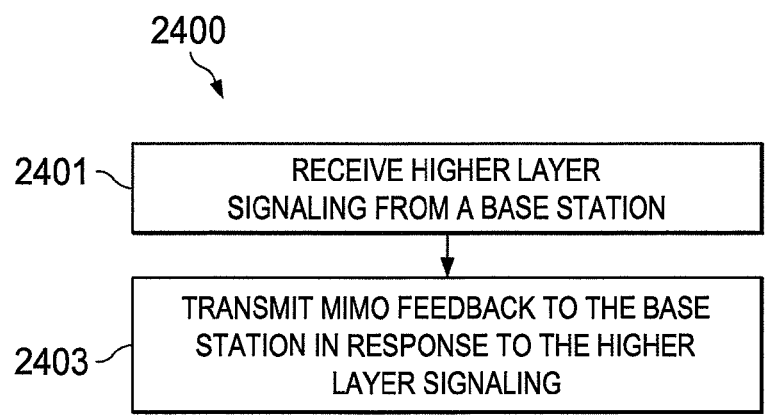
FIG. 24 illustrates a method of operating a subscriber station according to another embodiment of this disclosure.

FIG. 24 illustrates a method 2400 of operating a subscriber station according to another embodiment of this disclosure.

As shown in FIG. 24, method 2400 includes receiving a higher layer signaling from a base station (block 2401), and transmitting multiple-input multiple-output (MIMO) feedback to the base station in response to the higher layer signaling (block 2403). The higher layer signaling indicates a periodicity, an offset, and a physical uplink control channel (PUCCH) resource for each of two or more MIMO feedback processes used for the MIMO feedback by the subscriber station. One of the two or more MIMO feedback processes is a rank-limited single user multiple-input multiple-output (SU-MIMO) feedback process corresponding to a rank up to a maximum rank.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station comprising:
a transmit path circuitry configured to transmit downlink control information in a downlink control information (DCI) format to a subscriber station; and
a receive path circuitry configured to receive multiple-input multiple-output (MIMO) feedback from the subscriber station in response to the downlink control information,
wherein the MIMO feedback from the subscriber station is determined by two or more codepoints in the DCI format, and
wherein one of the two or more codepoints indicates a rank-limited single user multiple-input multiple-output (SU-MIMO) feedback including at least one of a Channel Quality Indication (CQI), a Precoder Matrix Indication (PMI) and a Rank Indication (RI) corresponding to each rank up to a maximum rank.

2. The base station in accordance with claim 1 wherein the maximum rank is configurable by the base station.

3. A method of operating a base station, the method comprising:
transmitting downlink control information in a downlink control information (DCI) format to a subscriber station; and
receiving multiple-input multiple-output (MIMO) feedback from the subscriber station in response to the downlink control information,
wherein the MIMO feedback from the subscriber station is determined by two or more codepoints in the DCI format, and
wherein one of the two or more codepoints indicates a rank-limited single user multiple-input multiple-output (SU-MIMO) feedback including at least one of a Channel Quality Indication (CQI), a Precoder Matrix Indication (PMI) and a Rank Indication (RI) corresponding to each rank up to a maximum rank.

4. The method in accordance with claim 3 wherein the maximum rank is configurable by the base station.

5. A subscriber station comprising:
a receive path circuitry configured to receive downlink control information in a downlink control information (DCI) format from a base station; and
a transmit path circuitry configured to transmit multiple-input multiple-output (MIMO) feedback to the base station in response to the downlink control information,
wherein the MIMO feedback from the subscriber station is determined by two or more codepoints in the DCI format, and
wherein one of the two or more codepoints indicates a rank-limited single user multiple-input multiple-output (SU-MIMO) feedback including at least one of a Channel Quality Indication (CQI), a Precoder Matrix Indication (PMI) and a Rank Indication (RI) corresponding to each rank up to a maximum rank.

6. The subscriber station in accordance with claim 5 wherein the maximum rank is configurable by the base station.

7. A method of operating a subscriber station, the method comprising:
receiving downlink control information in a downlink control information (DCI) format from a base station; and
transmitting multiple-input multiple-output (MEMO) feedback to the base station in response to the downlink control information,
wherein the MEMO feedback from the subscriber station is determined by two or more codepoints in the DCI format, and
wherein one of the two or more codepoints indicates a rank-limited single user multiple-input multiple-output (SU-MEMO) feedback including at least one of a Channel Quality Indication (CQI), a Precoder Matrix Indication (PMI) and a Rank Indication (RI) corresponding to each rank up to a maximum rank.

8. The method in accordance with claim 7 wherein the maximum rank is configurable by the base station.

9. A base station comprising:
a transmit path circuitry configured to transmit a higher layer signaling to a subscriber station; and
a receive path circuitry configured to receive multiple-input multiple-output (MIMO) feedback including at least one of a Channel Quality Indication (CQI), a Precoder Matrix Indication (PMI) and a Rank Indication (RI) from the subscriber station in response to the higher layer signaling, wherein the higher layer signaling indicates a periodicity, an offset, and a physical uplink control channel (PUCCH) resource for each of two or more MIMO feedback processes used for the MIMO feedback by the subscriber station, and wherein one of the two or more MIMO feedback processes is a rank-limited single user multiple-input multiple-output (SU-MIMO) feedback process corresponding to each rank up to a maximum rank.

10. The base station in accordance with claim 9 wherein the MIMO feedback from the subscriber station comprises:

at least one of a quantized principal right-singular vector of an averaged channel matrix and a quantized principal eigenvector of an averaged covariance matrix based at least partly upon the pilot or channel sounding signal as a spatial channel feedback, and at least one of the quantized principal right-singular vector of the averaged channel matrix and the quantized principal eigenvector of the averaged covariance matrix normalized towards a variance of interference plus noise as a channel quality feedback, and wherein the base station uses the spatial channel feedback and the channel quality feedback as feedback for multi-user multiple-input multiple-output (MU-MIMO) transmission.

11. The base station in accordance with claim 9 wherein the higher layer signaling indicates a first periodicity and a first offset for the rank-limited SU-MIMO feedback process, and a second periodicity different from the first periodicity and a second offset different from the first offset for a second MIMO feedback process different from the rank-limited SU-MIMO feedback process.

12. The base station in accordance with claim 9 wherein the higher layer signaling indicates that a feedback for the rank-limited SU-MIMO feedback process is transmitted by the subscriber station at a same subframe as a feedback for a second MIMO feedback process different from the rank-limited SU-MIMO feedback process if a rank of the second MIMO feedback process is greater than the maximum rank.

13. The base station in accordance with claim 9 wherein when the higher layer signaling indicates that a feedback for the rank-limited SU-MIMO feedback process is transmitted by the subscriber station at a same subframe as a feedback for a second MIMO feedback process different from the rank-limited SU-MIMO feedback process, the receive path circuitry is configured to receive the feedback for the rank-limited SU-MIMO feedback process.

14. A method of operating a base station, the method comprising:

transmitting a higher layer signaling to a subscriber station; and receiving multiple-input multiple-output (MIMO) feedback including at least one of a Channel Quality Indication (CQI), a Precoder Matrix Indication (PMI) and a Rank Indication (RI) from the subscriber station in response to the higher layer signaling, wherein the higher layer signaling indicates a periodicity, an offset, and a physical uplink control channel (PUCCH) resource for each of two or more MIMO feedback processes used for the MIMO feedback by the subscriber station, and wherein one of the two or more MIMO feedback processes is a rank-limited single user multiple-input multiple-output (SU-MIMO) feedback process corresponding to each rank up to a maximum rank.

15. The method in accordance with claim 14 wherein the MIMO feedback from the subscriber station comprises:

at least one of a quantized principal right-singular vector of an averaged channel matrix and a quantized principal eigenvector of an averaged covariance matrix based at least partly upon the pilot or channel sounding signal as a spatial channel feedback, and at least one of the quantized principal right-singular vector of the averaged channel matrix and the quantized principal eigenvector of the averaged covariance matrix normalized towards a variance of interference plus noise as a channel quality feedback, and wherein the base station uses the spatial channel feedback and the channel quality feedback as feedback for multi-user multiple-input multiple-output (MU-MIMO) transmission.

16. The method in accordance with claim 14 wherein the higher layer signaling indicates a first periodicity and a first offset for the rank-limited SU-MIMO feedback process, and a second periodicity different from the first periodicity and a second offset different from the first offset for a second MIMO feedback process different from the rank-limited SU-MIMO feedback process.

17. The method in accordance with claim 14 wherein the higher layer signaling indicates that a feedback for the rank-limited SU-MIMO feedback process is transmitted by the subscriber station at a same subframe as a feedback for a second MIMO feedback process different from the rank-limited SU-MIMO feedback process if a rank of the second MIMO feedback process is greater than the maximum rank.

18. The method in accordance with claim 14 wherein when the higher layer signaling indicates that a feedback for the rank-limited SU-MIMO feedback process is transmitted by the subscriber station at a same subframe as a feedback for a second MIMO feedback process different from the rank-limited SU-MIMO feedback process, receiving MIMO feedback comprises receiving the feedback for the rank-limited SU-MIMO feedback process.

19. A subscriber station comprising:

a receive path circuitry configured to receive a higher layer signaling from a base station; and a transmit path circuitry configured to transmit multiple-input multiple-output (MIMO) feedback to the base station in response to the higher layer signaling, wherein the higher layer signaling indicates a periodicity, an offset, and a physical uplink control channel (PUCCH) resource for each of two or more MIMO feedback processes used for the MIMO feedback including at least one of a Channel Quality Indication (CQI), a Precoder Matrix Indication (PMI) and a Rank Indication (RI) by the subscriber station, and wherein one of the two or more MIMO feedback processes is a rank-limited single user multiple-input multiple-output (SU-MIMO) feedback process corresponding to each rank up to a maximum rank.

20. The subscriber station in accordance with claim 19 wherein the MIMO feedback to the base station comprises:

at least one of a quantized principal right-singular vector of an averaged channel matrix and a quantized principal eigenvector of an averaged covariance matrix based at least partly upon the pilot or channel sounding signal as a spatial channel feedback, and at least one of the quantized principal right-singular vector of the averaged channel matrix and the quantized principal eigenvector of the averaged covariance matrix normalized towards a variance of interference plus noise as a channel quality feedback, and wherein the base station uses the spatial channel feedback and the channel quality feedback as feedback for multi-user multiple-input multiple-output (MU-MIMO) transmission.

21. The subscriber station in accordance with claim 19 wherein the higher layer signaling indicates a first periodicity and a first offset for the rank-limited SU-MIMO feedback process, and a second periodicity different from the first periodicity and a second offset different from the first offset for a second MIMO feedback process different from the rank-limited SU-MIMO feedback process.

22. The subscriber station in accordance with claim 19 wherein the higher layer signaling indicates that a feedback for the rank-limited SU-MIMO feedback process is transmitted by the subscriber station at a same subframe as a feedback for a second MIMO feedback process different from the rank-limited SU-MIMO feedback process if a rank of the second MIMO feedback process is greater than the maximum rank.

23. The subscriber station in accordance with claim 19 wherein when the higher layer signaling indicates that a feedback for the rank-limited SU-MIMO feedback process is transmitted by the subscriber station at a same subframe as a feedback for a second MIMO feedback process different from the rank-limited SU-MIMO feedback process, the transmit path circuitry is configured to transmit the feedback for the rank-limited SU-MIMO feedback process.

24. A method of operating a subscriber station, the method comprising:
   receiving a higher layer signaling from a base station; and
   transmitting multiple-input multiple-output (MIMO) feedback to the base station in response to the higher layer signaling,
   wherein the higher layer signaling indicates a periodicity, an offset, and a physical uplink control channel (PUCCH) resource for each of two or more MIMO feedback processes used for the MIMO feedback including at least one of a Channel Quality Indication (CQI), a Precoder Matrix Indication (PMI) and a Rank Indication (RI) by the subscriber station, and
   wherein one of the two or more MIMO feedback processes is a rank-limited single user multiple-input multiple-output (SU-MIMO) feedback process corresponding to each rank up to a maximum rank.

25. The method in accordance with claim 24 wherein the MIMO feedback to the base station comprises:
   at least one of a quantized principal right-singular vector of an averaged channel matrix and a quantized principal eigenvector of an averaged covariance matrix based at least partly upon the pilot or channel sounding signal as a spatial channel feedback, and
   at least one of the quantized principal right-singular vector of the averaged channel matrix and the quantized principal eigenvector of the averaged covariance matrix normalized towards a variance of interference plus noise as a channel quality feedback, and
   wherein the base station uses the spatial channel feedback and the channel quality feedback as feedback for multi-user multiple-input multiple-output (MU-MIMO) transmission.

26. The method in accordance with claim 24 wherein the higher layer signaling indicates a first periodicity and a first offset for the rank-limited SU-MIMO feedback process, and a second periodicity different from the first periodicity and a second offset different from the first offset for a second MIMO feedback process different from the rank-limited SU-MIMO feedback process.

27. The method in accordance with claim 24 wherein the higher layer signaling indicates that a feedback for the rank-limited SU-MIMO feedback process is transmitted by the subscriber station at a same subframe as a feedback for a second MIMO feedback process different from the rank-limited SU-MIMO feedback process if a rank of the second MIMO feedback process is greater than the maximum rank.

28. The method in accordance with claim 24 wherein when the higher layer signaling indicates that a feedback for the rank-limited SU-MIMO feedback process is transmitted by the subscriber station at a same subframe as a feedback for a second MIMO feedback process different from the rank-limited SU-MIMO feedback process, transmitting MIMO feedback comprises transmitting the feedback for the rank-limited SU-MIMO feedback process.

* * * * *